May 6, 1952     C. H. WHITE     2,595,554
DISK HARROW
Filed Nov. 11, 1944     2 SHEETS—SHEET 1
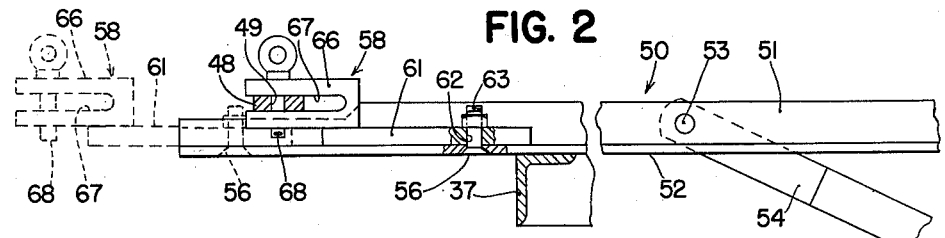
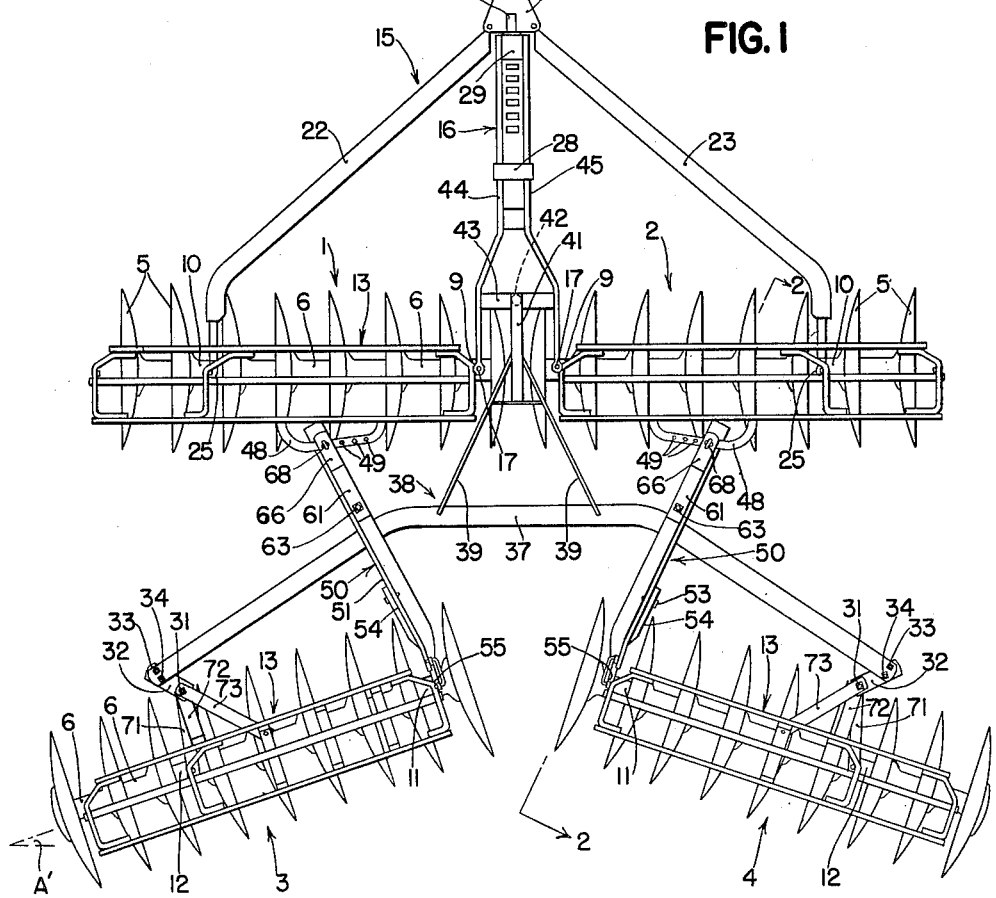
*INVENTOR.*
CHARLES H. WHITE
BY
ATTORNEYS

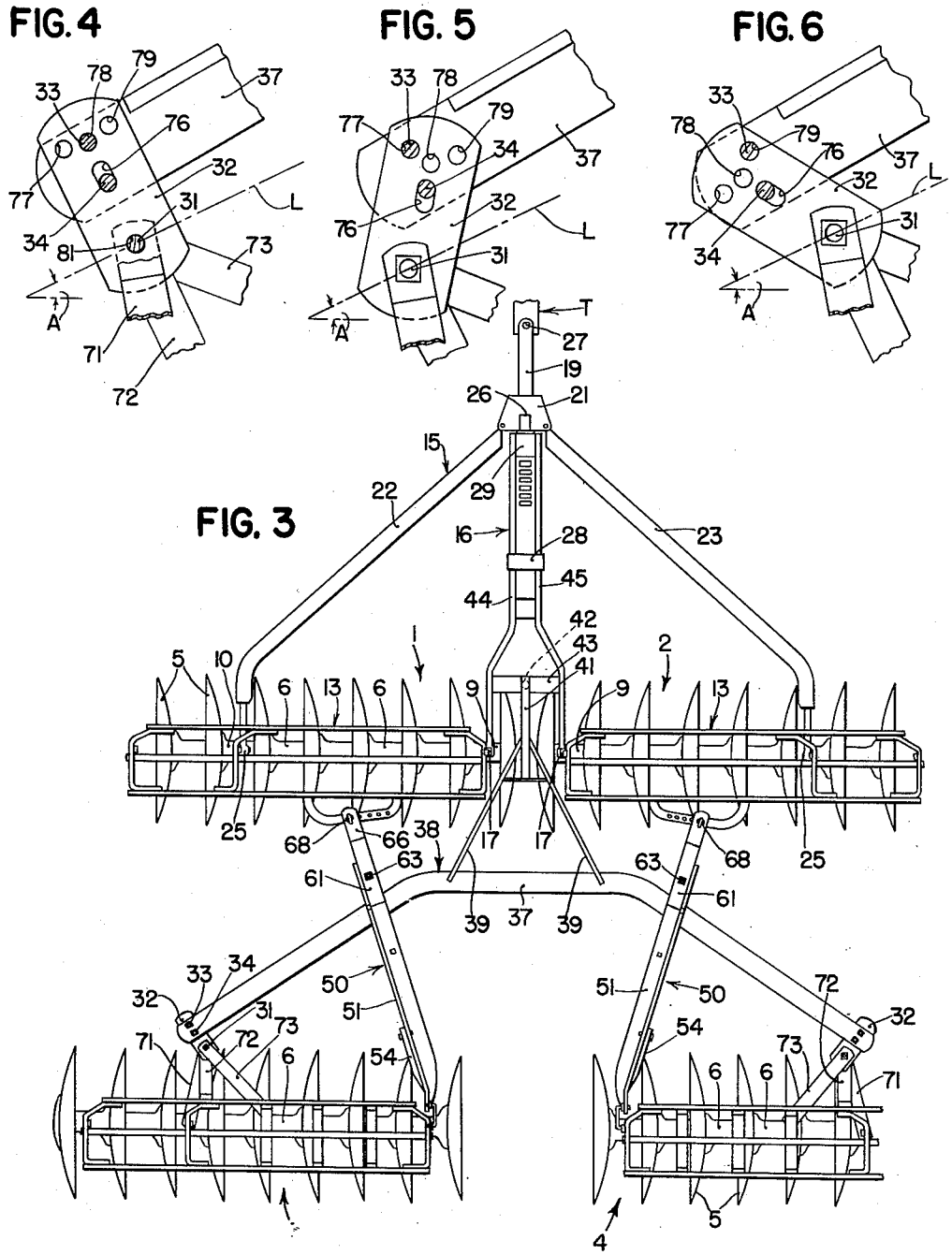

Patented May 6, 1952

2,595,554

UNITED STATES PATENT OFFICE 2,595,554

DISK HARROW

Charles H. White, Moline, Ill., assignor to Deere & Company, Moline, Ill., a corporation of Illinois Application November 11, 1944, Serial No. 563,002

6 Claims. (Cl. 55—83)

1

The present invention relates generally to agricultural implements and more particularly to disk harrows and similar soil working implements.

The object and general nature of the present invention is the provision of a new and improved disk harrow in which provision is made for adjusting the rear gangs toward and away from one another in a lateral direction so as to cause the rear gangs to track properly with respect to the front gangs. For example, adjustments of this type may be necessary for causing the harrow to leave the ground level, neither ridged nor furrowed in the center. Further, it is a particular feature of this invention to provide means for adjusting the lateral position of the rear gangs, which adjustment does not produce any substantial variation in the angular position of the gangs. In other words, the angle that each disk gang makes with respect to the other and with respect to the direction of forward travel is substantially constant in any position of lateral adjustment. Still further, another feature of the present invention is the provision of connecting link means making it possible to angle only the rear gangs, leaving the front gangs straight, and in which position the lateral adjustment mentioned above is effective to vary the lateral position of the rear gangs without changing their angle. This is possible due to the fact that the aforesaid link means is designed to hold the rear gangs in an angled position such that, in this position of the rear gangs, the lateral adjustment mechanism maintains substantially constant the angle of the gangs in different lateral positions of the gangs.

These and other objects and advantages of the present invention will be apparent to those skilled in the art after a consideration of the following detailed description, taken in conjunction with the accompanying drawings in which the preferred form of the present invention has been illustrated.

In the drawings:

Figure 1 is a plan view of a tractor drawn disk harrow in which the principles of the present invention have been incorporated.

Figure 2 is a view, taken generally along the line 2—2 of Figure 1, showing the two optional positions of the adjusting link that is provided between each front gang and the associated rear gang.

Figure 3 is a view similar to Figure 1, showing the disk harrow in its straightened or transport position.

Figures 4, 5 and 6 show the details of the means

2

I have provided for producing lateral adjustment of the rear gangs bodily toward one another in a lateral direction without changing their angular position.

Referring first to Figures 1 and 3, the disk harrow shown comprises a pair of front gangs 1 and 2 and a pair of rear gangs 3 and 4. Each gang includes a plurality of ground working disks 5 with spacing spools 6 disposed therebetween, all mounted on a gang bolt in accordance with conventional construction, certain of said spools having or serving as bearing means, as indicated at 9 and 10 for the front gangs, and 11 and 12 for the rear gangs, by which each gang carries a scraper frame 13.

A hitch structure 15 includes a drawbar 16 connected pivotally, as at 17, to the inner ends of the front gangs 1 and 2. The drawbar 16 includes a front draft receiving channel member 19 slidable within the drawbar 16. Mounted on the channel member 19 is a front slide box 21 to which the forward ends of a pair of draft links 22 and 23 are pivotally connected. The rear ends of the draft links 22 and 23 are pivotally connected to the laterally outer gang bearings 10, as indicated at 25. The hitch structure is such that by means of a latch 26 the slide 21 may be connected to the slidable drawbar channel 19, whereby when the tractor to which the harrow is connected, as at 27, is driven forwardly, the channel 19 moves forwardly with respect to the drawbar 16 until a stop plate 28 engages an end piece 29 on the channel 19, this movement carrying with it the slide 21 and the draft bars 22 and 23, whereby the forward ends of the front gangs 1 and 2 are swung forwardly about the vertical axes as defined by the pivot connections 17 between the rear end of the drawbar 16 and the inner ends of the gangs 1 and 2.

Each of the rear gangs 3 and 4 is pivotally connected, as by a pivot bolt 31, to a laterally adjustable arm 32 that is adjustably fixed, as by a pair of bolts 33 and 34, to the associated end of a generally transverse frame member 37 that forms a part of a frame structure 38 connecting the front and rear gangs. Secured to the central portion of the transverse frame bar 37 by a pair of braces 39 is a gooseneck 41 having its forward end turned downwardly to form a pivot 42 connected to a cross bar 43 carried by the rear portions of a pair of side members 44 and 45 making up the drawbar 16. The frame structure 38 is thus capable of swinging laterally about a vertical axis as defined by the pivot connection 42. Secured to each of the forward gangs 1 and 2 and outwardly of the pivot 17 thereof is a bracket 48 having a plurality of openings 49 in the central portion thereof.

Each of the rear gangs 3 and 4 is pivotally connected to the associated front gang by means of a link member 50 which is of particular construction. As best shown in Figure 2 the link member 50 includes an angle 51 having a horizontal flange 52 and apertured to receive a rivet 53 by which a reenforcing bar 54 is connected thereto. The rear end of the bar is pivotally connected, as at 55, to the laterally inner disk bearing 11, the axis at 55 extending generally vertically. At its front end each of the angles 51 has a pair of openings 56 formed in the horizontal flange 52 thereof, and the front end of the link member 50 comprises an attaching member 58. Each attaching member 58 comprises a block 61 apertured, as at 62, to receive a bolt 63 which is adapted to be inserted in either one of the openings 56. Secured to the forward end of each block 61 is a clip 66 slotted, as at 67, to receive the central portion of the associated bracket 48. The clip 66 is apertured to receive a pivot pin 68, and the clip 58 is secured as by welding or the like to the front end of the block 61. As best shown in Figure 2, when the attaching member 58 is secured to the angle 51 by bolting the same to the rear opening 56 in the flange 52, the effective length of the link member 50 is less than when the attaching member 58 is bolted in its forward position with the bolt 63 inserted in the forward opening 56. The pin 68 is adapted to be inserted in one or the other of the openings 49 in the bracket 48.

For normal operation, as when it is desired to angle and straighten the gangs 1, 2, 3 and 4 together, the link member 50 is arranged with the attaching member 58 in its extended position (dotted lines, Figure 2), which is the position shown in Figure 3. When in this position, the links 50 hold the front and rear gangs together, both when they are straightened, as shown in Figure 3, and when they are angled. To angle the disk gangs from their straightened positions, as shown in Figure 3, the tractor T is driven forwardly with the latch 26 engaged with the slidable channel 19. A forward pull is exerted through the draft members 22 and 23 which swings the outer ends of the forward gangs 1 and 2 into their angled position. The forward swinging of the front gangs 1 and 2 exerts a pull through the link members 50 which, in turn, swings the rear gangs 3 and 4 about their pivots 31, thus pulling the rear gangs into their angled position. The harrow may be straightened by backing the tractor or releasing the latch 26 and then driving forwardly, which permits the outer ends of the front gangs and the inner ends of the rear gangs to fall back into their straightened position (Figure 3).

When it is desired to operate with only the rear gangs angled, as shown in Figure 1, as may sometimes be desired when filling in dead furrows, leveling back furrows, ditches and the like, the operator removes each of the attaching members 58 from its forward position (dotted lines, Figure 2) and bolts it in its rear position (full lines, Figure 2) and reattaches it to the bracket 48. This brings the rear disks into an angled working position, as shown in Figure 1, while the front disks remain inactive in their straightened or transport position. When operating the harrow in this position the latch 26 is released from the channel 19 so that when the tractor is driven forwardly the stop bar 28 comes up against the end plate 29 of the drawbar 16 but leaves the slide 21 in the position shown.

It is not infrequently desired to adjust the lateral position of the rear gangs 3 and 4, particularly when they are arranged as shown in Figure 1, and to this end I have provided a particular kind of attachment mechanism for connecting the laterally adjustable arms 32 to the ends of the transverse frame bar 37. Referring now to Figures 4, 5 and 6, it will be noted that these figures show the underside of the arms 32 and associated parts. It will also be noted that the pivot bolt 31 is disposed at the forward end of three forwardly converging bars 71, 72 and 73, the latter serving as a diagonal brace while the others are connected with the rear gang bearing 12 and the scraper frame 13, respectively. Each outer end of the transverse frame bar 37 is apertured to receive the attaching bolts 33 and 34, and each laterally adjustable pivot arm 32 is provided with a central slot 76 and three bolt-receiving openings 77, 78 and 79, together with another opening 81 (Figure 4) to receive the pivot bolt 31. The laterally adjustable pivot arm 32 may be fixed in position with the associated end of the transverse frame bar 37 in any one of three different positions. Figures 3 and 4 show the pivot bar 32 in its central or intermediate position, Figure 5 shows the bar 32 in its laterally outer position, and Figures 1 and 6 show the bar 32 in its inner position, thus providing three different lateral positions for the rear gangs 3 and 4.

According to the principle of the present invention, this lateral adjustment of the rear gangs toward or away from each other does not change the angle of the gangs when they are in their full working position, as, for example, when the links 50 are shortened to have the front gangs straight while the rear gangs are angled. This result is secured by so arranging the connection between the laterally adjustable arms 32 that in the different positions of adjustment, the arm openings 81 move in a direction generally parallel to the angle of the gangs, that is, in a direction parallel to the longitudinal axis of the rear gangs in their working position (Figure 1). This line of adjustment is indicated in Figures 4–6 by the reference character L, which makes an angle A with a transverse vertical plane, this angle also being substantially the same as the angle of the gangs, as indicated at Figure 1. While, strictly speaking, the angle A (Figures 4–6) is not exactly the same as the angle A' (Figure 1) of the rear gangs, these angles are approximately the same. Actually, in order to have the angle A' of the rear gangs 3 and 4 the same in the three different positions of lateral adjustment, as provided for by the laterally adjustable arms 32, the line L is not exactly parallel to the longitudinal axis of the gangs but diverges slightly therefrom, due to the fact that when the rear gangs are adjusted inwardly or outwardly, the links 50 swing about the axes as defined by the pivot pins 68, these links 50, being at an angle as shown in Figure 1, thus not only move laterally but also slightly fore and aft when the gangs 3 and 4 are adjusted toward or away from one another, and therefore the line L makes a slightly greater angle A with respect to a transverse vertical plane than the angle A', in order that the angle A' shall not vary in the different positions in which the rear gangs may be placed.

Figure 4 shows the laterally adjustable arm 32 in its central position, it being noted that the bolt 34 passes through the rear portion of the central slot 76 and the other bolt 33 passes through the central opening 78. If, for example, it should be desired to increase the spacing between the rear gangs 3 and 4, the bolt 34 is loosened but not removed, while the bolt 33 is removed and replaced after the arm 32 has been swung over into the position shown in Figure 5 which permits the bolt 33 to be passed through the laterally outer opening 77. This is the position shown in Figure 5. On the other hand, if it should be desired to decrease the lateral spacing between the rear gangs, the bolt 33 is removed to permit the rear end of the pivot bar 32 to be swung inwardly, permitting the bolt 33 to be inserted through the opening 79. It will be seen from Figures 5 and 6, that these two positions require that the center bolt 34 be disposed in the upper portion of the slot 76 and that the three openings 77, 78 and 79 are disposed in such position that the three different positions of the pivot bolt 31 lie in the line L. While I have shown a lateral adjustment in which only three positions are provided for, it will be understood that a greater number of openings may be provided in the arm 32 so as to establish, for example, four, five or more lateral positions if desired.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A disk harrow comprising a pair of front gangs, a pair of rear gangs, each pair of gangs being swingable in a generally horizontal direction into and out of angled working positions, link means connecting the corresponding front and rear gangs whereby all of said gangs move into and out of said positions simultaneously, said link means being adjustable in effective length to provide for angling the rear gangs when the front gangs are in a straightened position, said links being pivoted to said front and rear gangs, means connecting said front and rear gangs including a generally transversely extending frame bar, a laterally adjustable arm pivotally connected at its rear end to the associated rear gang, there being an arm at each end of said generally transverse frame bar, and means fixing said arms to the ends, respectively, of said frame bar in different positions of lateral adjustment of the rear ends of said arms, thereby shifting said rear gangs generally bodily toward and away from each other, said arm connecting means being arranged so that when said adjustable links are in their shortened position, accommodating an angled position of the rear gangs while the front gangs are in their straightened position, lateral adjustments of said arms cause said rear gangs to be shifted toward and away from each other in successively parallel positions so that the working angle of said rear gangs remains substantially unchanged.

2. In a disk harrow, a generally transversely arranged disk gang, a frame to which said gang is connectible, means connecting one end of said disk gang with said frame comprising a relatively long link member pivotally connected at its opposite ends with said gang and frame, a relatively short link, materially shorter than said first mentioned link, pivotally connected at one end with said gang, and means connecting the other end of said link with said frame and including means for securing said link to said frame in different predetermined positions, said connecting means being arranged so that in changing the position of said relatively short link, the end thereof to which said gang is connected moves through a path of movement substantially parallel to the path of movement of the end of said relatively long link, whereby by changing the position of said relatively short link, the position of the disk gang relative to the frame is changed by shifting into different substantially parallel positions.

3. In a disk harrow, a generally transversely arranged disk gang, a frame to which said gang is connectible, a member pivotally connected at one end with said gang and connectible at its other end with said frame, said member having at its other end a plurality of openings, and a pair of connecting means for connecting said member rigidly with said frame, one of said connecting means being disposable in one of said plurality of openings and the other of said connecting means disposable in a selected one of the other openings in said member, said openings in said member being arranged so that by removing the second mentioned connecting means and disposing it in different openings, the end of said member to which said frame is connected is shifted transversely with respect to said frame, thereby shifting said gang into different positions of adjustment transversely of said frame, the opening in said member through which said first mentioned connecting means extends being a slot, and the other openings being arranged spacially so that the end of said member to which said gang is connected is shifted transversely in approximately a straight line.

4. The invention set forth in claim 15, further characterized by said openings in said member being arranged spacially with respect to said two connecting means whereby said member may be shifted relative to said frame so as to carry the end of said member to which said gang is connected generally transversely of said frame in an approximately straight line.

5. A disk harrow comprising frame means, a disk gang shiftable relative to said frame means into an angled working position, a first link member connecting one end of said disk gang with said frame means and accommodating lateral movement of the disk gang relative thereto, a laterally swingable arm pivotally connected at its rear end to the other end of said disk gang, and means for fixing said arm to said frame means to hold the arm in different positions of lateral adjustment, said arm fixing means comprising a pair of connectors, one of which is removable, said arm and frame means having pairs of registering openings adapted to receive said pair of connectors whereby the arm may be connected to the frame means and held against lateral swinging, one of said frame means and the forward end of said arm having a plurality of transversely spaced openings adapted to receive said removable connector and one of the openings receiving the other connector being slotted, whereby by removing said one connector, shifting said arm relative to the frame means about the other connector as a pivot, and reinserting said removable connector in one of the other of said plurality of spaced openings, the rear end of said arm is shiftable generally transversely of the harrow into different positions lying substantially in a straight line.

6. In a disk harrow of the type including a front frame means, a front gang, and a rear gang, the combination of a connecting member for pivotally connecting one end of said rear gang to said front gang, and means for connecting the other end of said rear gang to said frame means in different positions relative to the latter, said connecting means including a generally rearwardly extending part pivotally connected at its rear portion to said other end of the rear gang and, at a point forward thereof, to said frame means, and means acting against said part and said frame means at a point spaced from the point at which said part is pivoted to said frame means for fixing the forward end of said part to said frame in different positions of adjustment so as to dispose the rear portion of said part in different lateral positions relative to said frame.

CHARLES H. WHITE.

REFERENCES CITED

The following references are of record in the file of this patent:

UNITED STATES PATENTS

| Number | Name | Date |
|---|---|---|
| 1,156,843 | Imus | Oct. 12, 1915 |
| 1,409,569 | Pollard | Mar. 14, 1922 |
| 1,550,061 | Dewend | Aug. 18, 1925 |
| 2,143,193 | Goble | Jan. 10, 1939 |
| 2,163,818 | White | June 27, 1939 |
| 2,228,508 | Crumb | Jan. 14, 1941 |
| 2,251,788 | Goble | Aug. 5, 1941 |
| 2,320,015 | Seaholm | May 25, 1943 |